Patented Jan. 18, 1944

2,339,357

UNITED STATES PATENT OFFICE 2,339,357

TOOL ALLOY

Charles J. Schafer, Baltimore, Md.

No Drawing. Application June 5, 1942,
Serial No. 445,978

7 Claims. (Cl. 75—123)

This invention relates to alloys and has for its object the provision of new zirconium and columbium containing alloys of great hardness, strength and durability, and especially adapted for use in the making of high speed cutting tools for machine shop practices as well as finer cutting instruments and blades of many types, including those for surgical and dental use. The alloys are also useful in making other tools such as twist drills, saws, files, wrenches, shears, and the like.

This application is a continuation-in-part of my copending application Serial No. 393,262, filed May 13, 1941.

My novel alloys may be used to great advantage in place of many of the alloy and carbon steels, but without the necessity of tempering the products except in very special cases involving the more intricately formed tools such as certain twist drills, threading dies and some similar tools, which have to be forged or drawn into shape and then completed by hardening. The novel alloys are subject to some variation in their iron content depending upon the desired resistance to the action of acids or to tarnishing, for example due to the sterilizing medium which may be used. The alloys are generally non-corrosive and non-tarnishing and resistant to many acids, and they may be welded, forged, swaged, heated, and reheated with a minimum of loss.

The chief constituents of the new alloys are zirconium and columbium, the latter being combined with a certain amount of tantalum which occurs in the same ores and which it is not necessary to eliminate, since it lends certain desirable qualities to the alloy. I have found that the novel alloy is superior in properties, including its hardness and tensile strength to the tungsten, molybdenum, vanadium, nickel, and chrome steels which are now in widespread use.

The alloys may be produced in bar stock or cast in the ultimate form of tool or other product in which it is to be used. Unlike certain prior products they are not made from sintered or granular materials compacted under pressure, such as for example tungsten-carbide, and the alloy may comprise the entire tool instead of made as a tip for a steel shank as in the case of certain other cutting products.

The general range of percentages of the principal elements comprising the group of alloys provided by the present invention may be set forth as follows:

|   | Per cent |
|---|---|
| Zirconium | From 10 to 40 |
| Columbium | From 3 to 20 |
| Tantalum | From 1 to 8 |
| Titanium | From none to 15 |
| Tungsten | From none to 25 |
| Iron | Balance |

Conveniently, the columbium and the tantalum are introduced in combination since they are obtained from the same ores in the pre-melt or reduction step, as will be more clearly understood as the specification proceeds.

As indicated, the titanium and tungsten are omitted in the preparation of alloys for certain purposes.

There will now be set forth various optional formulas for specific alloys within the purview of the invention and an indication of the general uses to which they are adapted.

For a cutting tool for general use or for the preparation of a bar stock for the making of tools, the following two formulas may be employed. The first will yield a stock having a hardness of 75 on the Rockwell-C scale, and the second will have a hardness of 65 on the same scale.

Hardness 75

|   | Per cent |
|---|---|
| Zirconium | About 30 |
| Columbium | About 12 |
| Tantalum | About 2.5 |
| Titanium | About 7.5 |
| Iron | About 48 |

Hardness 65

|   | Per cent |
|---|---|
| Zirconium | About 35 |
| Columbium | About 14 |
| Tantalum | About 3 |
| Iron | About 48 |

In addition to the bar stock referred to above which may be employed for making cutting tools or as a basis for the manufacture of other articles, other formulas within the scope of the invention may be employed. For example, a satisfactory cutting blade for numerous purposes may be produced from a stock having the following composition:

|   | Percent |
|---|---|
| Zirconium | About 25 |
| Columbium | About 3 |
| Tantalum | About 0.5 |
| Iron | Balance |

For making twist drills, it is preferred to use from 5% to 10% of one of the bar stock alloys first described, and add it to steel in the furnace. The resultant alloy steel may be poured and worked up into the final product in the usual way.

Magnetic and non-magnetic alloys of this general nature may be produced according to the following formulas, the aluminium and yttrium being substituted for a portion of the iron in the respective cases.

*Magnetic alloy*

| | Percent |
|---|---|
| Zirconium | 25 |
| Columbium | 6 |
| Tantalum | 1 |
| Aluminium | 15 |
| Iron | 53 |

*Non-magnetic alloy*

| | Percent |
|---|---|
| Zirconium | 15 |
| Columbium | 6 |
| Tantalum | 1 |
| Yttrium | 5–10 |
| Iron | Balance |

Besides the most appropriate use of the alloy in the production of cutting tools and other instruments such as have been described, the alloy may also be employed in the production of sheet material of great strength and durability and it may be employed in maritime construction particularly on account of its non-corrosive properties. One suggested formula for an alloy for use in the making of ship hull, deck, and housing plates is as follows:

| | Percent |
|---|---|
| Zirconium | 20– 30 |
| Columbium | 4– 14 |
| Tantalum | 0.5– 3 |
| Iron | 74.5–53 |

In producing these alloys certain of the constituents are preferably reduced directly from their ores, and reference is made to my copending application Serial No. 393,262, and to my application Serial No. 412,500, for a complete disclosure of the preferred modes of producing the novel alloys which comprise the subject of the present application.

In cases where extreme hardness of the alloy is necessary or desirable, titanium nitride or titanium boro-carbide may be introduced. These titanium hardeners are very satisfactory substitutes for tungsten which is employed in the production of articles similar to those described in the present application and my copending applications. When titanium boro-carbide is used, the amount employed is within a range of from 2% to 25%, although it is preferable in many cases to limit the range to from 3% to 15%. In the case of titanium nitride the percentages run from 5% to 20% since the action here is somewhat different. When these titanium hardeners are used they may be introduced in any of the above formulas, the titanium compounds replacing an equivalent percentage of the iron.

Having thus described the invention, what is claimed as new and desired to be secured by Letters Patent is:

1. An alloy which consists essentially of from 10% to 40% zirconium, from 4% to 28% columbium and tantalum taken together, and the balance substantially iron.

2. An alloy which consists essentially of 10% to 40% zirconium, 3% to 20% columbium, 1% to 8% tantalum, and the balance substantially iron.

3. An alloy which consists of about 35% zirconium, about 17% columbium and tantalum taken together, and about 48% iron.

4. An alloy which consists of about 35% zirconium, about 14% columbium, about 3% tantalum, and about 48% iron.

5. A magnetic alloy of high degree of hardness and strength comprising about 25% zirconium, about 6% columbium, about 1% tantalum, about 15% aluminium, and the balance iron.

6. An extremely hard alloy consisting of the metals set forth in claim 5 and in the relative proportions therein indicated, to which has been added a compound selected from the group consisting of titanium nitride and titanium boro-carbide in a amount constituting from 2%–25% of the whole.

7. An extremely hard alloy consisting of the metals set forth in claim 5 and in the relative proportions therein indicated, to which has been added titanium boro-carbide in an amount constituting from 2%–25% of the whole.

CHARLES J. SCHAFER.